United States Patent Office 3,288,797
Patented Nov. 29, 1966

3,288,797
LIPOIC ACID DERIVATIVES AND THEIR PREPARATION
Ulrich Schmidt, Freiburg im Breisgau, Germany, assignor to E. Merck Aktiengesellschaft, Darmstadt, Germany
No Drawing. Filed Aug. 17, 1964, Ser. No. 390,202
Claims priority, application Germany, Aug. 20, 1963, M 57,881
8 Claims. (Cl. 260—294.8)

This invention is concerned with derivatives of lipoic (or thioctic) acid and with their preparation.

It has been found that the hitherto unknown compound, lipoylpyridoxamine, and its acid addition salts are therapeutically valuable substances. Lipoylpyridoxamine has a higher activity than lipoic acid itself which is, for example, of importance as a co-factor in the oxidative decarboxylation of $\alpha$-keto acids and the new compound has a higher affinity for the enzyme protein of lipoic acid, dehydrogenase, than lipoic acid itself.

According to the present invention, therefore, lipoylpyridoxamine and its acid addition salts are provided as new compounds.

The present invention also comprises a process for the preparation of these new compounds which comprises reacting a lipoic acid derivative having a functionally modified carboxyl group which renders the derivative capable of amide formation, with pyridoxamine and thereafter, if desired, converting the lipoylpyridoxamine obtained into an acid addition salt.

In principle the new compound can be made by any conventional process for the preparation of acid amides. The processes used in the synthesis of peptides are particularly advantageous (see for example "Organic Reactions," volume XII, 157, et seq.), more particularly the reactions with mixed anhydrides, imidazolides and O-acyl-ureas. The use of a mixed anhydride of lipoic acid and a carbonic acid monoalkylester as the lipoic acid derivatives starting material offers very considerable advantages. The preparation of the anhydride and the subsequent reaction with pyridoxamine can in this case be carried out in the same reaction vessel without the anhydride being isolated. The mixed anhydride of lipoic acid and a carbonic acid monoalkylester is advantageously obtained by reaction of lipoic acid, with for example, a halo-formic acid ester, such as chloro-formic acid ethyl ester. The pyridoxamine is advantageously reacted with the mixed anhydride at relatively low temperatures (below 0° C.). The solution is then allowed to heat up slowly and the lipoylpyridoxamine is isolated from the reaction mixture in the conventional manner.

In principle, pyridoxamine can be reacted also with lipoic acid anhydride but the latter compound is very difficult to prepare so that the use of a mixed anhydride is much more advantageous.

Lipoylpyridoxamine can also be obtained by reaction of lipoyl chloride with pyridoxamine. Lipoyl chloride is, for example, obtainable from an alkali metal salt of lipoic acid and oxalyl chloride. Condensation to form the amide is advantageously carried out in the presence of a basic compound, for example pyridine, and advantageously at temperatures below room temperature.

The lipoylpyridoxamine obtained can be converted by any suitable method of physiologically compatible acid addition salts. Suitable acids are, for example, the following: hydrohalic acids, such as hydrochloric and hydrobromic acid, methanesulfonic acid and p-toluenesulfonic acid.

A particular advantage of the new compound is that the acid addition salts of lipoylpyridoxamine represent a satisfactorily active water-soluble form of the otherwise water-insoluble lipoic acid. The hydrochloride can, for example, be recrystallized very satisfactorily and is stable. The compound can thus be used wherever water-soluble lipoic acid derivatives are needed.

Lipoylpyridoxamine is also a lipoid-soluble physiological derivative of pyridoxamine (vitamin $B_6$) and can therefore also advantageously be used as a constituent of vitamin combination preparations.

The new compounds can be administered, in admixture with conventional carriers or excipients, in human or veterinary medicine. Suitable carriers are organic or inorganic substances suitable for parenteral or enteral applications and which do not react with the new compounds, for example water, vegetable oils, polyethylene glycols, gelatin, lactose, starch, magnesium stearate, talc, petroleum jelly and cholesterol. Solutions, more particularly oily or aqueous solutions, and suspensions or emulsions are used for parenteral application. Tablets or coated tablets are preferred for enteral application. The dosage ranges from about 0.5 to about 500 mg.

*Example*

5.01 g. of lipoic acid are dissolved in 100 ml. of chloroform. The solution is cooled to $-25°$ C. and 3.5 ml. of triethylamine followed by 2.5 ml. of chloro-formic acid ethylester are added slowly. Agitation is continued for another 30 minutes at $-25°$ C.

6.6 g. of pyridoxamine dihydrochloride are boiled with 100 ml. of an 0.5 N solution of sodium ethylate in ethyl alcohol. The solution is concentrated until dry under reduced pressure. 150 ml. of chloroform are poured over the residue and thoroughly mixed therewith.

The solution of the mixed anhydride of lipoic acid and carbonic acid semi-ester is added dropwise to the suspension of free pyridoxamine which is cooled to $-25°$ C. The mixture is agitated until its temperature reaches room temperature and is then left for five hours. It is then washed with water and aqueous sodium hydrogen carbonate solution. The chloroform solution is concentrated under reduced pressure and the residue is re-crystallized from ethyl acetate. 6.5 g. of lipoylpyridoxamine having a melting point of 117–199° C. are obtained. After re-crystallization from acetone, the melting point rises to 121–123° C.

From this compound, the following acid addition salts were prepared in the usual way: hydrochloride, hydrobromide, methanesulfonate, and p-toluenesulfonate.

What I claim is:
1. Lipoylpyridoxamine.
2. Physiologically acceptable acid addition salts of lipoylpyridoxamine.
3. Lipoylpyridoxamine hydrochloride.
4. Lipoylpyridoxamine hydrobromide.
5. Lipoylpyridoxamine methanesulfonate.
6. Lipoylpyridoxamine p-toluenesulfonate.
7. A process for the preparation of lipoylpyridoxamine and its acid addition salts, which comprises reacting a lipoic acid derivative having a functionally modified carboxyl group which renders the derivative capable of amide formation, with pyridoxamine.
8. A process according to claim 7, in which the lipoic acid derivative is a mixed anhydride of lipoic acid and a carbonic acid monoalkyl ester.

References Cited by the Examiner

FOREIGN PATENTS 952,636   3/1964   Great Britain.

WALTER A. MODANCE, *Primary Examiner.*

A. L. ROTMAN, *Assistant Examiner.*